United States Patent [19]

Ahlstrom, Jr.

[11] Patent Number: 4,461,745

[45] Date of Patent: Jul. 24, 1984

[54] SELF REGENERATING CATALYTIC REACTOR

[75] Inventor: Ross C. Ahlstrom, Jr., Lake Jackson, Tex.

[73] Assignee: The Dow Chemical Company, Midland, Mich.

[21] Appl. No.: 367,205

[22] Filed: Apr. 12, 1982

[51] Int. Cl.$^3$ .............................................. B01J 8/06
[52] U.S. Cl. ................................. 422/197; 422/201; 422/312
[58] Field of Search ............... 422/197, 191, 196, 190, 422/201, 312

[56] References Cited

U.S. PATENT DOCUMENTS

| | | | |
|---|---|---|---|
| 1,945,812 | 2/1934 | Jaeger | 422/197 |
| 2,263,363 | 11/1941 | Menshih | 422/197 |
| 3,147,084 | 9/1964 | Franzen et al. | 422/197 |
| 3,268,299 | 8/1966 | Russell | 422/197 X |
| 3,779,711 | 12/1973 | Gryaznov et al. | 422/196 X |
| 3,982,903 | 9/1976 | Anderson | 422/201 |
| 4,256,783 | 3/1981 | Takada et al. | 422/197 |
| 4,337,224 | 6/1982 | Mahler et al. | 422/197 |
| 4,368,173 | 1/1983 | Jimenez et al. | 422/197 |

*Primary Examiner*—Richard L. Chiesa
*Attorney, Agent, or Firm*—A. C. Ancona

[57] ABSTRACT

A reactor of the shell and tube type wherein the head on the first end of the reactor is divided by a partition. A reactant, e.g. oxygen, is passed into one side of the divided head, passed through the tubes containing catalyst on one side of the reactor which are available to that portion of the head. Upon exiting into the head at the opposite end of the reactor the reactant oxygen is mixed with another reactant, e.g. a chlorinated hydrocarbon, and fed into tubes on the other side of the reactor, which also contains catalyst, and wherein the oxidation of the chlorinated hydrocarbon occurs. The product gases exit on the side of the divided head opposite the oxygen inlet at the first end of the reactor. A heat exchange medium surrounds the tubes and circulates within the shell to either heat or cool the said tubes as necessary. When the catalyst employed in the reaction becomes coated with carbonaceous material the flow is reversed and the oxygen fed into that side of the reactor to regenerate the catalyst.

2 Claims, 2 Drawing Figures

SECTION A-A

4,461,745

SELF REGENERATING CATALYTIC REACTOR

BACKGROUND OF THE INVENTION

In many reactions which employ catalysts, catalyst life is relatively short and the catalyst must be regenerated. In order to operate such processes efficiently, it is necessary to have two reactors, one in which the process is running while the other is being regenerated. This, of course, increases the capital expenditure since two reactors are needed.

For example, in oxidation reactions wherein organic hydrocarbons are oxidized to oxygen-containing products, e.g. aldehydes ketones or acids, the catalyst frequently becomes fouled with carbon and this carbon must be removed before the catalyst is again effective. Also in high temperature chlorinations of hydrocarbons some decomposition and carbonization will occur leaving carbonaceous deposits on the catalyst. Catalytic reduction of unsaturated hydrocarbons involving use of platinum, tantalum, nickel are also susceptible to fouling and carbon build-up.

The present invention is a novel reactor constructed in such a way as to enable the catalyst in one-half of the reactor to be regenerated while the other half is operating in the desired process. It also enables the heat of reaction to be efficiently utilized.

SUMMARY OF THE INVENTION

A reactor of the shell and tube type wherein the head on the first end of the reactor is divided by a partition. A reactant, e.g. oxygen, is passed into one side of the divided head, passed through the tubes containing catalyst on one side of the reactor which are available to that portion of the head. Upon exiting into the head at the opposite end of the reactor the reactant oxygen is mixed with another reactant, e.g. a chlorinated hydrocarbon, and fed into tubes on the other side of the reactor, which also contain catalyst, and wherein the oxidation of the chlorinated hydrocarbon occurs. The product gases exit on the side of the divided head opposite the oxygen inlet at the first end of the reactor. When the catalyst employed in the reaction becomes coated with carbonaceous material the flow is reversed and the oxygen fed into that side of the reactor to regenerate the catalyst.

DETAILED DESCRIPTION OF THE PREFERRED EMBODIMENT

Figure 1:
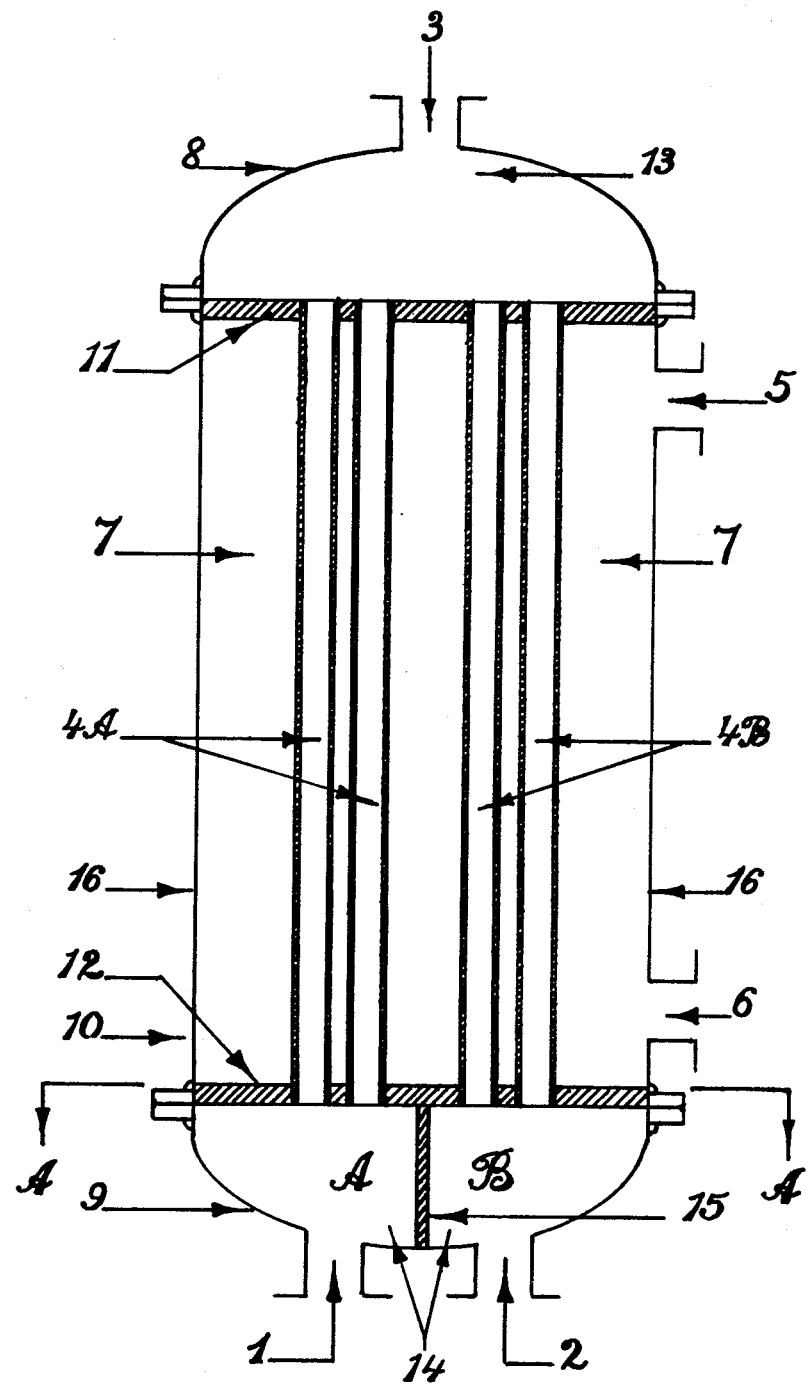

FIG. 1 shows the reactor 10 which comprises a plurality of tubes 4A and 4B joined at their ends by tube sheets 11 and 12 and disposed axially within a cylindrical shell 16 which is closed with heads 8 and 9 at its two ends. Said heads and tube sheets defining chambers 13 and 14, chamber 14 being divided by partition 15 into compartments A and B. Chambers 13 and 14 are in communication with the open ends of the tubes 4A and 4B, said tubes containing a catalyst and having means for retaining said catalyst within said tubes. Chamber 13 is accessed by port 3 and entry or exit from compartments A and B of chamber 14 are provided by ports 1 and 2, respectively. Space 7 outside tubes 4A, 4B inside shell 16 and between tube sheets 11, 12 defines a heat exchange chamber wherein a heat transfer fluid is circulated between all tubes within said shell via ports 5 and 6 by a pump not shown. Baffles (not shown) may be used to improve heat transfer within the shell.

Figure 2:
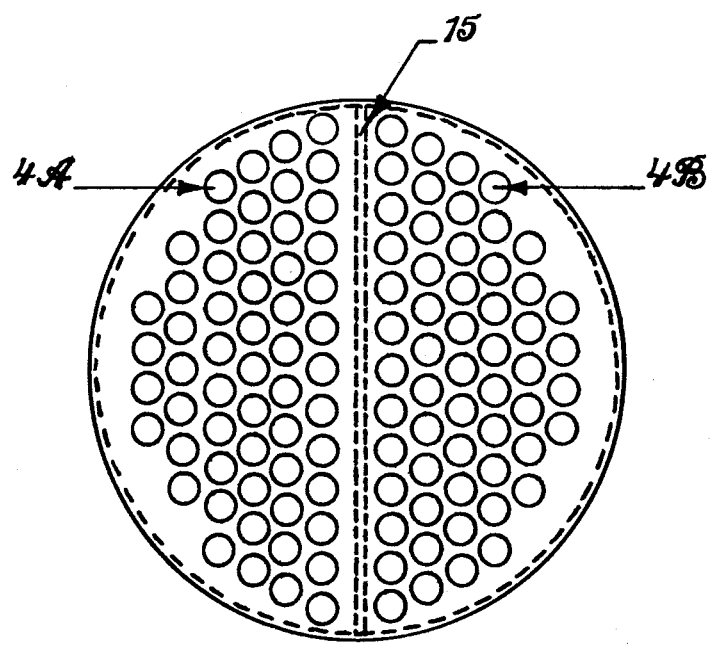

FIG. 2 shows a cross section of the reactor at the tube sheet joining tubes 4A and 4B to the chamber 14. Numeral designations are the same as in FIG. 1.

This reactor allows efficient use of heat generated in one half the reactor to be effectively employed in the other half by the circulation of this heat exchange fluid. In the case of oxidation of hydrocarbons, it allows the carbon build-up on the catalyst in the reaction section to be removed by reversing the flow and oxidizing the carbonaceous deposits on the catalyst by passing oxygen thereover. The unreacted oxygen is heated to higher temperatures as it flows through the catalyst to be regenerated and is at or near the reaction temperature for the oxidation when it mixes with the chlorinated hydrocarbon in the head at the opposite end of the reactor. This in effect makes the regeneration section a preheater. The mixture is reacted by passing through the catalyst and the product is taken out the other side of the divided head.

In use, for example, referring to the drawing, oxygen or an oxygen-containing gas, is passed into compartment B of chamber 14 via port 2 and from thence over the catalyst, e.g. $Cr_2O_3$ on alumina, in tubes 4B. The oxygen stream exits the catalyst in tubes 4B into chamber 13 which preferably contains an inert (noncatalytic) packing material to permit efficient mixing of the oxygen with the other reactant, e.g. $CCl_4$, which is introduced into chamber 13 through 3. After mixing, the stream of $CCl_4$ vapors and oxygen pass into the catalyst ($Cr_2O_3$) in tubes 4a where the reaction occurs, in this case forming $CO_2$ and $Cl_2$. When the catalyst in tubes 4A becomes inactive by virtue of carbonaceous deposits on its surfaces oxygen can be introduced into compartment A of chamber 14 via port 1, and from thence passed over the catalyst in tubes 4A to burn off the carbonaceous deposits and regenerate the catalyst. The desired process, i.e. generating chlorine from $CCl_4$, is continued by means of employing the catalyst in tubes 4B by passing the oxygen mixed in chamber 13 with the $CCl_4$, introduced via port 3, into said tubes. This is accomplished by valve-switching means (not shown) which changes the direction of flow through the reactor, putting reactant oxygen into port 1 instead of port 2 and taking product out of port 2 instead of port 1. Flow of reactant $CCl_4$ remains the same, albeit subject to interruption and/or reduction during the flow reversal, through port 3.

I claim:

1. A reactor of the shell and tube type comprising a plurality of tubes disposed within a shell, and fixed within said shell by attachment to a tube sheet at each of their ends, each of said tube sheets being joined continuously at its respective periphery to said shell, thereby defining a heat exchange chamber outside of said tubes and inside said shell, said shell having inlet and outlet ports positioned between said tube sheets so that a fluid exchange medium may circulate therein, said shell being closed at both ends to form chambers between said closed ends and said tube sheets, said chambers being in communication with said tubes, one of said chambers being divided by a partition into first and second compartments, the other chamber remaining undivided, each of said compartments and the undivided chamber having a port therein through the closed end of said shell, so that a first fluid reactant introduced through said port of said first compartment of said divided chamber may pass through the tubes which connect said first compartment with said undivided chamber into said undivided chamber, wherein said first fluid reactant may mix with a second fluid reactant introduced through said port of said undivided chamber, said first and second reactants thereafter may pass through the tubes which connect said undivided chamber with said second compartment into said second compartment and then may exit said port of said second compartment.

2. The reactor of claim 1 wherein said tubes contain a catalyst.

* * * * *